United States Patent [19]
Jenkins et al.

[11] Patent Number: 5,435,489
[45] Date of Patent: Jul. 25, 1995

[54] ENGINE EXHAUST GAS DEFLECTION SYSTEM

[75] Inventors: Julian L. Jenkins; Tommie L. Wood, both of Arlington; Albert G. Brand, North Richland Hills, all of Tex.

[73] Assignee: Bell Helicopter Textron Inc., Fort Worth, Tex.

[21] Appl. No.: 180,646

[22] Filed: Jan. 13, 1994

[51] Int. Cl.⁶ .............................................. B05B 1/34
[52] U.S. Cl. ........................... 239/265.17; 239/265.23; 239/290; 239/299; 239/DIG. 7; 60/231
[58] Field of Search ..................... 239/DIG. 7, 265.17, 239/265.19, 265.23, 265.11, 290, 295, 299, 429, 433; 60/231

[56] References Cited

U.S. PATENT DOCUMENTS

| | | | |
|---|---|---|---|
| 2,052,869 | 9/1936 | Coanda | 239/DIG. 7 X |
| 2,793,493 | 5/1957 | Kadosch et al. | 239/265.17 |
| 3,016,699 | 1/1962 | Bertin et al. | 239/265.17 |
| 3,749,317 | 7/1973 | Osofsky | 239/265.23 X |
| 3,765,363 | 10/1973 | Wald | 60/231 X |
| 4,047,381 | 9/1977 | Smith | 60/231 X |
| 4,069,977 | 1/1978 | Vaughan, III | 239/265.23 |
| 4,486,470 | 12/1984 | Stuck et al. | 239/DIG. 7 X |

FOREIGN PATENT DOCUMENTS 1125036 10/1956 France ........................ 239/265.17

Primary Examiner—Andres Kashnikow
Assistant Examiner—Lesley D. Morris
Attorney, Agent, or Firm—John M. Cone; William Lloyd Clayborn

[57] ABSTRACT

Nozzles for discharging high velocity air are positioned on either side of an aircraft engine exhaust duct exit. High velocity air is discharged tangential to an outer surface of each nozzle and follows the contour thereof. The nozzles are positioned so that when the high velocity air separates from the outer surface of the respective nozzles, it flows outwardly relative to the aircraft's fuselage structure. The high velocity air from the nozzle closest to the aircraft's fuselage structure impinges on the exhaust gas stream, deflecting the stream away from the fuselage. The high velocity air from the nozzle furthest from the fuselage creates a low pressure area which deflects the exhaust gas stream away from the fuselage. In combination, the two nozzles deflect the exhaust gas stream away from the fuselage to a significant degree.

8 Claims, 4 Drawing Sheets

ENGINE EXHAUST GAS DEFLECTION SYSTEM

BACKGROUND OF THE INVENTION

The present invention relates to a system for deflecting the exhaust gas stream of an aircraft engine away from the aircraft's fuselage structure.

U.S. Pat. No. 2,052,869 (Coanda) discloses the Coanda effect. In fact, the Coanda effect comprises two effects. First, a high velocity stream of fluid issuing from an orifice will follow a suitably shaped contour which extends from the orifice. Second, as the stream of high velocity fluid follows the contour, it produces a low pressure area, entraining the fluid surrounding the orifice.

SUMMARY OF THE INVENTION

To deflect the engine exhaust gas of an aircraft engine outboard away from the aircraft's fuselage structure, a nozzle is located on either side of the rear portion of the engine's exhaust duct. In operation, high pressure air is supplied to a cylinder which is included in each nozzle. The high pressure air is distributed evenly along the length of the nozzle's plenums through a series of small holes in the cylinders. The air then exits the nozzles at high velocity through a slot in each nozzle.

The positions of the slots are such that the high velocity air exits the slots tangential to the outer surface of the cylinders. Due to the Coanda effect, the high velocity air follows the contour of the cylinders. In the case of the inboard nozzle, the high velocity air impinges on the exhaust gas stream, deflecting it outboard away from the aircraft fuselage. In the case of the outboard nozzle, the flow of the high velocity air along the nozzle's cylinder creates a low pressure area adjacent to the cylinder which draws the exhaust gas stream toward the outboard side of the exhaust duct. The combined effects of the two nozzles result in significant deflection of the exhaust gas stream outboard away from the aircraft fuselage.

BRIEF DESCRIPTION OF THE DRAWINGS

Several embodiments of the invention will be described, by way of example only, with reference to the accompanying drawings, in which.

DETAILED DESCRIPTION

A preferred embodiment of the invention is utilized to deflect a wing-mounted aircraft engine's exhaust gasses away from the aircraft's fuselage structure. Herein, "inboard" refers to the direction nearest the fuselage and "outboard" refers to the direction furthest from the fuselage.

Figure 1:
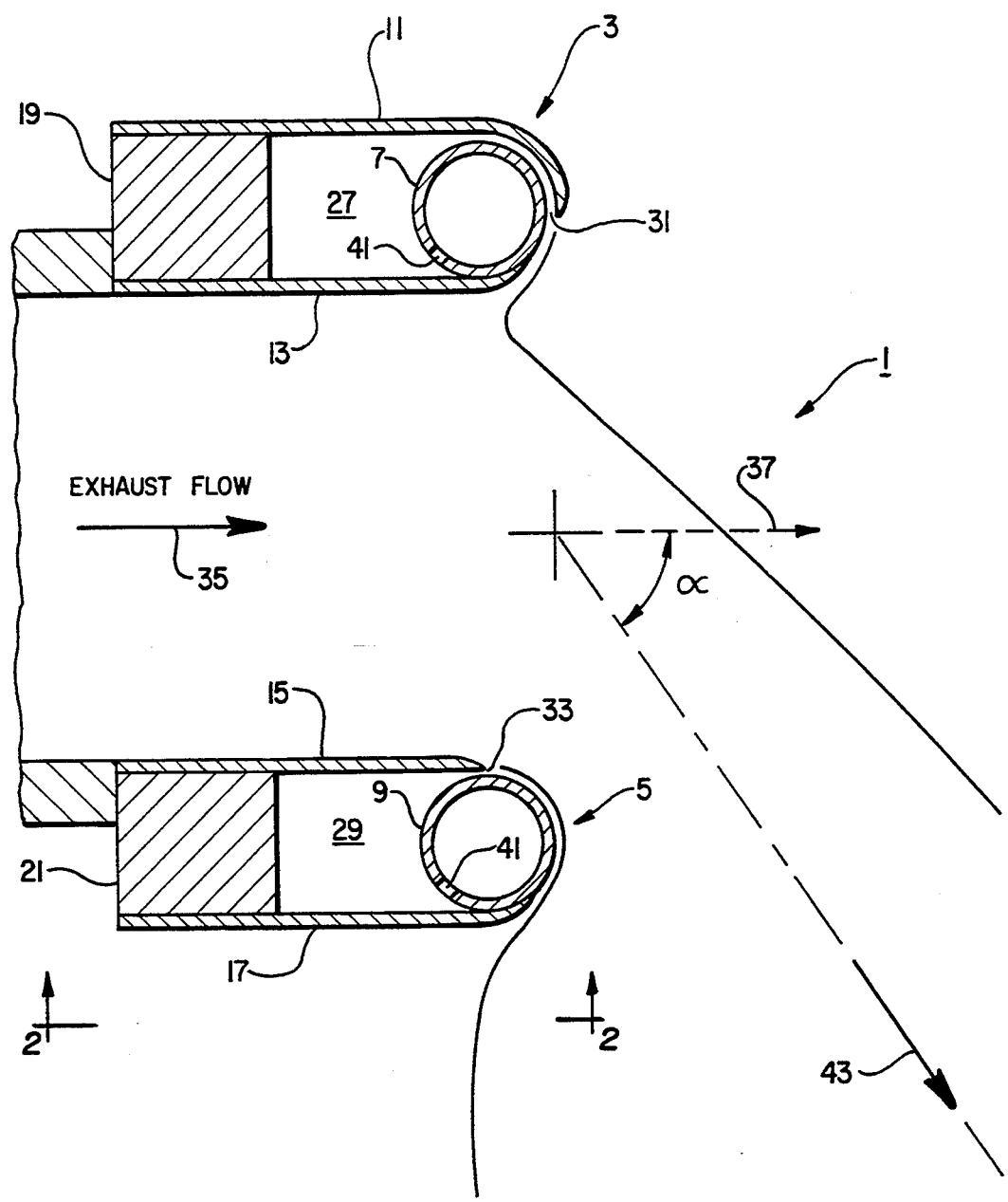
FIG. 1 is a sectional top view of the rear portion of an engine exhaust duct which includes a preferred embodiment of the invention.
Figure 2:
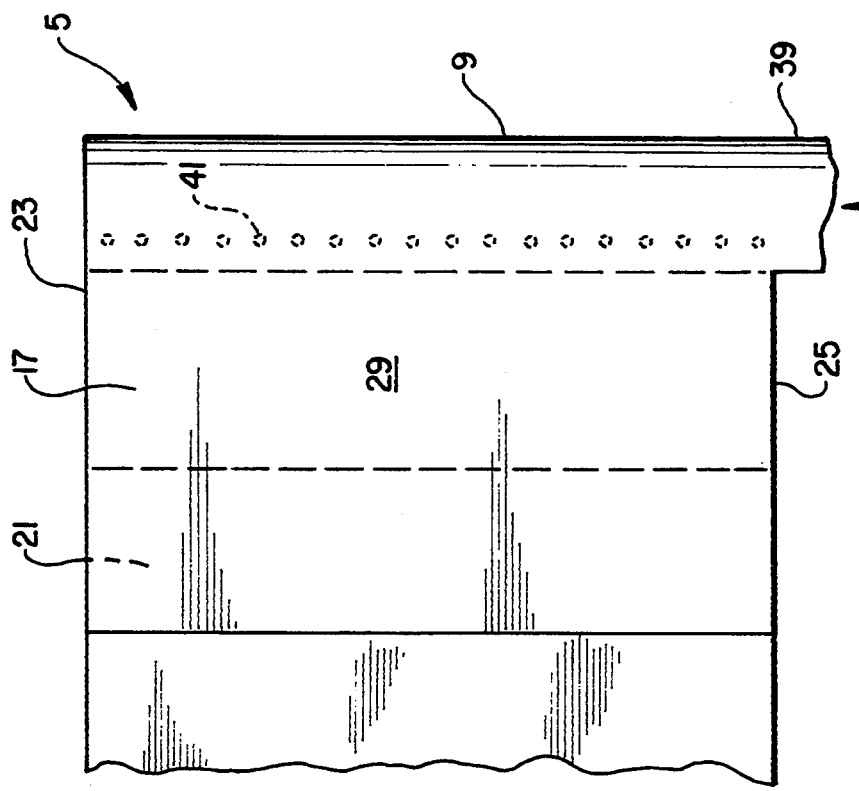
FIG. 2 is a side view of the engine exhaust duct of FIG. 1 taken through plane 2—2.

Referring to FIGS. 1 and 2, an engine exhaust duct 1 includes an inboard Coanda nozzle 3 and an outboard Coanda nozzle 5 at its exit. Each nozzle 3, 5 is formed by a cylinder 7, 9, two walls 11, 13, 15, 17, a plug 19, 21, and upper and lower walls 23, 25. The upper and lower walls of the inboard Coanda nozzle 3 are not shown. The foregoing members 3,5, 11, 13, 15, 17, 19, 21, 23, 25, also form plenums 27, 29.

The cylinders 7, 9 are attached to respective outboard nozzle walls 13, 17 by suitable means, such as welding or bonding. The inboard nozzle walls 11, 15 are spaced away from the respective cylinders 7, 9, thereby forming an inboard Coanda nozzle slot 31 and an outboard Coanda nozzle slot 33. It will be noted that the slot 31 of the inboard nozzle 3 is located approximately 90 degrees from the inboardmost point of the inboard cylinder 7, while the slot 33 of the outboard nozzle 5 is located adjacent to the inboardmost point of the outboard cylinder 5.

When the Coanda nozzles 3, 5 are not operating, the engine exhaust flows in the direction indicated by arrows 35, 37. In operation, high pressure air is introduced into the cylinders 7, 9 through a conduit 39 attached to one end of each cylinder 7, 9. A series of small holes 41 spaced along the length of the cylinders 3, 5 provide an equal distribution of high pressure air along the length of the plenums 27, 29. The air then exits the plenums 27, 29 through the respective slots 31, 33 at high velocity and tangent to the respective cylinders 7, 9. Due to the Coanda effect, the high velocity air follows the contour of the cylinders 7, 9. In the case of the inboard Coanda nozzle 3, the high velocity air impinges on the exhaust gas stream, causing it to deflect toward the outboard side of the duct 1. In the case of the outboard Coanda nozzle 5, the flow of the high velocity air along the surface of the cylinder 9 creates a low pressure areal adjacent to the cylinder 9 which draws the exhaust gas stream toward the outboard side of the duct 1. As a result of the combined effects of the two nozzles 3, 5, the exhaust gas flow is deflected outboard as indicated by arrow 43.

Figure 3:
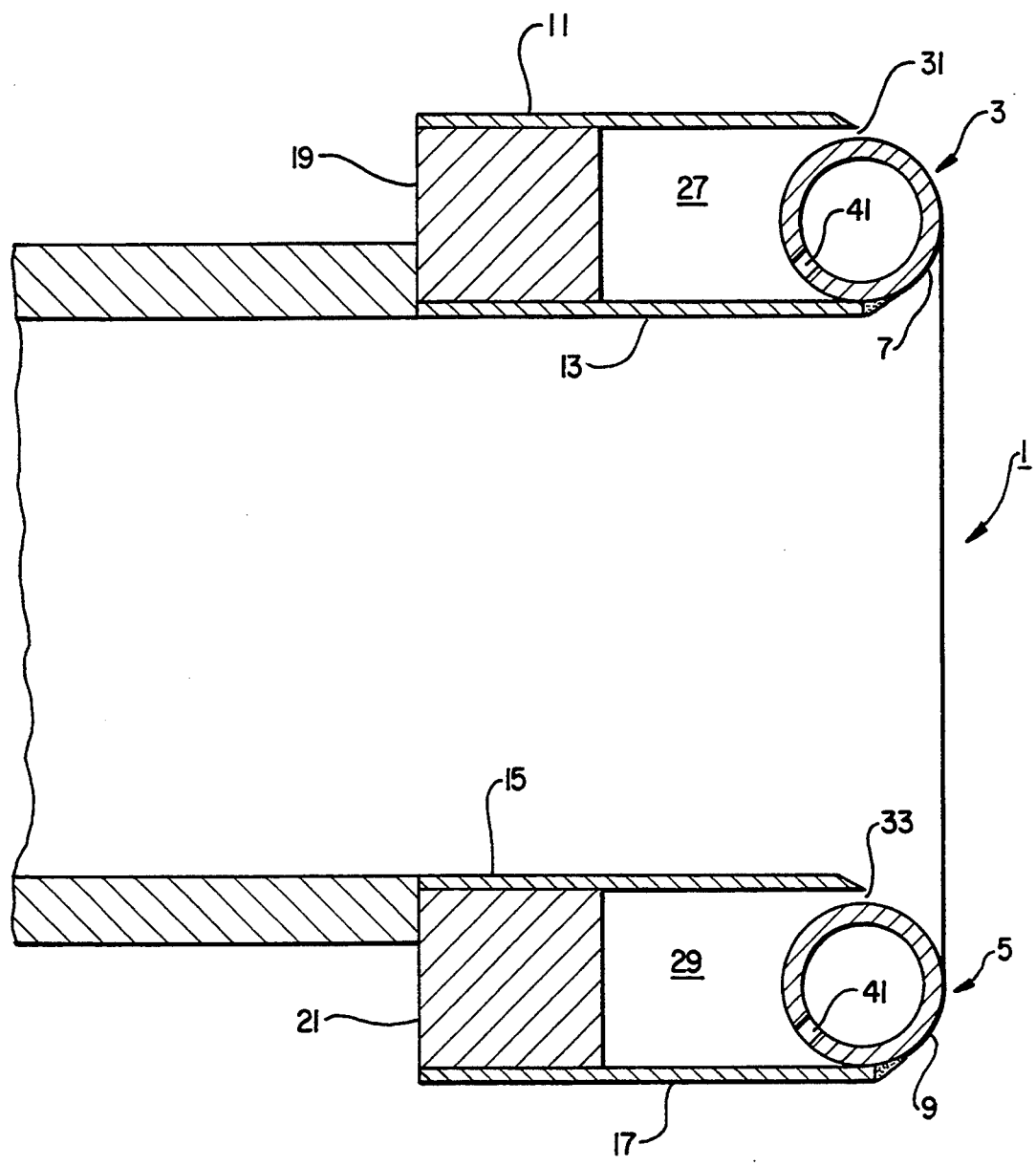
FIG. 3 is a sectional top view of the rear portion of an engine exhaust duct which includes an alternate embodiment of the invention.

FIG. 3 is an alternate embodiment of the present invention. As can be seen, the sole difference between this embodiment and that described above is that is that inboard Coanda nozzle slot 31 is located adjacent to the inboardmost point of the inboard cylinder 7. That is, the slot 31 in FIG. 3 is located 90 degrees from the position shown in FIG. 1.

For a given Coanda nozzle configuration, the deflection of the exhaust gas stream is dependent on the momentum of the Coanda nozzle air streams relative to that of the exhaust gas stream. A momentum coefficient is defined as:

$$C\mu = 2 \frac{\Sigma\, m_s\, V_s}{m_d\, V_d}, \text{ where}$$

$m_s$ = Coanda nozzle slot air mass flow rate (slugs/sec);
$V_s$ = Coanda nozzle slot air mass velocity (feet/sec);
$m_d$ = exhaust gas mass flow rate (slugs/sec); and
$V_d$ = exhaust gas velocity (feet/sec).

Figure 4:
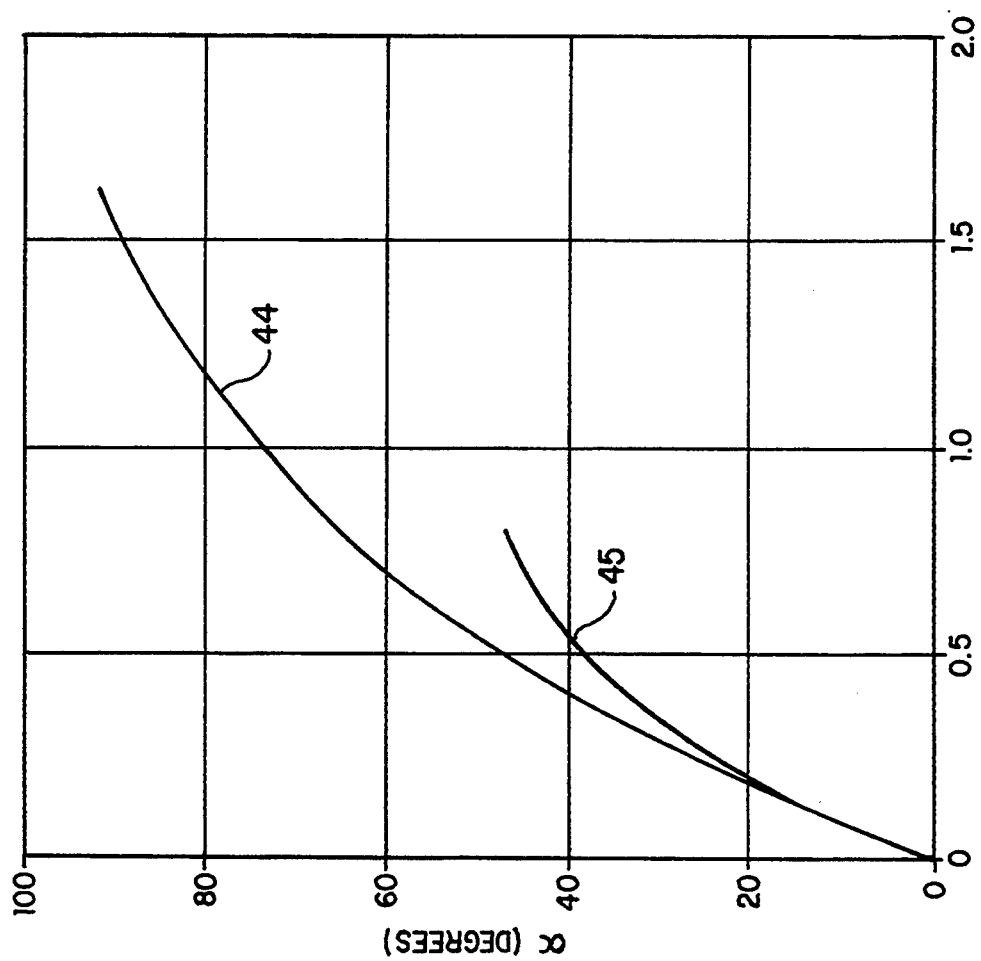
FIG. 4 is a graph showing the performance of the embodiments shown in FIGS. 1-3.

FIG. 4 is a graph showing the exhaust gas stream deflection angle, $\alpha$, versus the momentum coefficient, $C_\mu$, for the embodiments of FIGS. 1-3. As can be seen, the configuration shown in FIGS. 1 2 (curve 44) is more effective in deflecting the exhaust gas stream than that shown in FIG. 3 (curve 45).

It is believed that the high velocity air from the inboard Coanda nozzle slot 31 separates from the inboard Coanda nozzle cylinder 7 earlier in the embodiment shown in FIG. 3 than in the embodiment shown in FIGS. 1-2, resulting in the high velocity air having less effect on the exhaust gas stream than in the embodiment of FIGS. 1-2. As a result, less momentum in the outboard direction is transferred to the exhaust gas stream.

Figure 5:
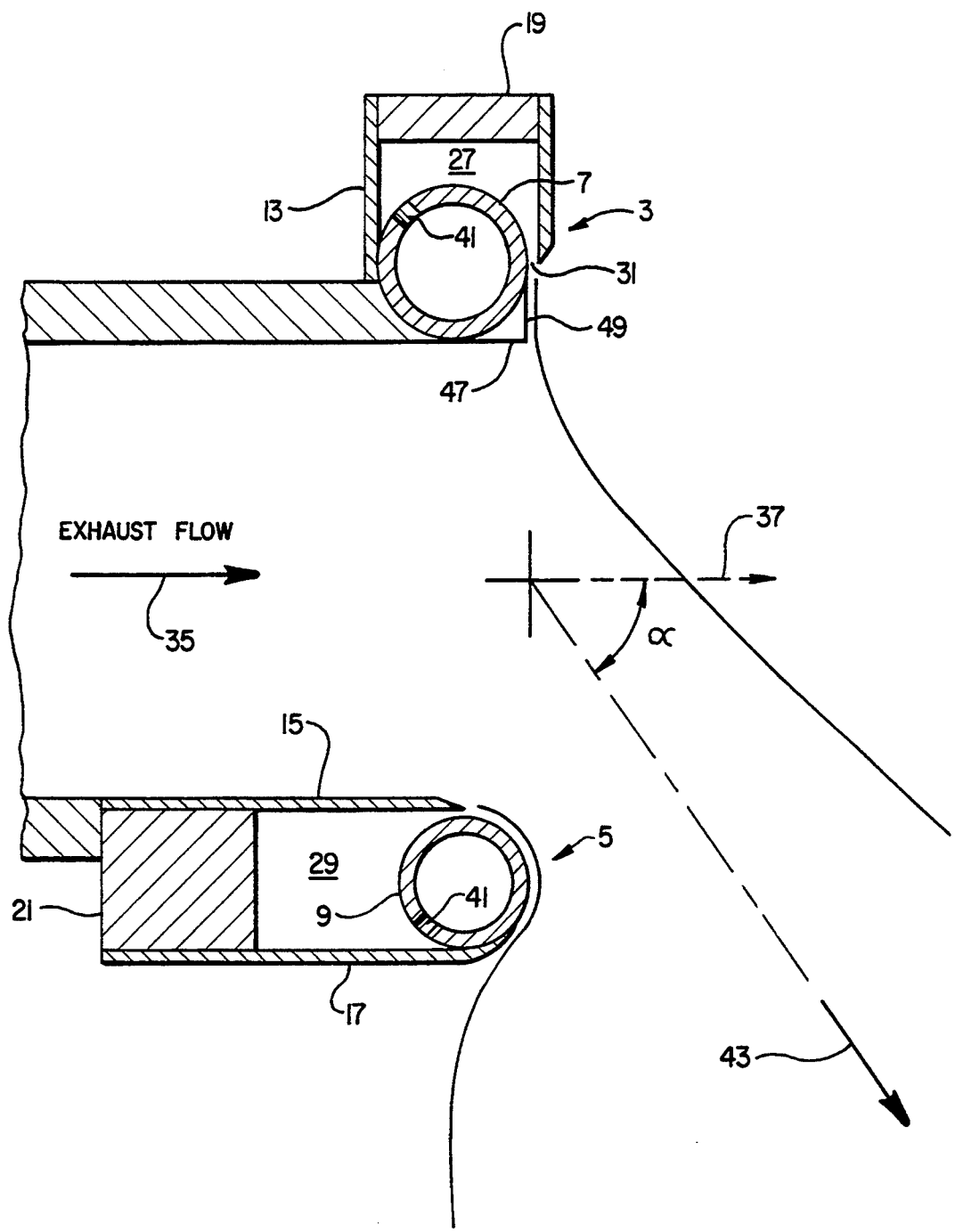
FIG. 5 is a section top view of the rear portion of an engine exhaust duct which includes another alternate embodiment of the invention.

FIG. 5 is another alternate embodiment of the invention. The inboard nozzle 3 in this embodiment is a momentum nozzle and does not rely on the Coanda effect. This embodiment is substantially similar to that shown in FIGS. 1-2, except a 90 degree angle flange 47 is attached to the cylinder wall 7 of the inboard nozzle 3 and the plenum 27 is relocated to provide for more efficient flow of high velocity air through the slot 31. A downstream leg 49 of the 90 degree angle flange 47 is tangential to the inboard cylinder 7. The downstream leg 49 of the 90 degree angle flange 47 forces the high velocity air to separate from the inboard cylinder 7 and impinge on the exhaust gas stream at an angle of 90 degrees to the undeflected direction of exhaust gas flow. The deflection of the exhaust gas stream by this embodiment of the invention is comparable to that shown by curve 44 in FIG. 4.

While the preferred embodiment and two alternate embodiments of the invention have been shown and described, it will be apparent to those skilled in this art that various modifications may be made to this embodiment without departing from the spirit of the present invention. For that reason, the scope of the invention is set forth in the following claims.

We claim:

1. An engine exhaust gas deflection system comprising:
   a first nozzle disposed adjacent to an edge of an engine exhaust duct;
   said first nozzle including an opening for discharging a high velocity fluid;
   said high velocity fluid being discharged tangential to an outer surface of said first nozzle and following the contour thereof;
   said first nozzle being positioned so that when said high velocity fluid separates from the outer surface of said first nozzle, said high velocity fluid flows at an angle relative to an undeflected exhaust gas flow direction;
   a second nozzle disposed adjacent to an opposing edge of said engine exhaust duct;
   said second nozzle including an opening for discharging high velocity fluid;
   said high velocity fluid being discharged tangential to an outer surface of said second nozzle and following the contour thereof; and
   said second nozzle being positioned so that when said high velocity fluid separates from the outer surface of said second nozzle, said high velocity fluid flows at an angle relative to the undeflected exhaust gas flow direction.

2. The system of claim 1 wherein when said velocity fluid separates from the outer surface of each of said nozzles, said high velocity fluids substantially perpendicular to the undeflected exhaust gas flow direction.

3. An engine exhaust gas deflector system comprising;
   a first nozzle and a second nozzle, said nozzles being disposed on opposing sides of an engine exhaust duct;
   each nozzle including an opening for discharging a high velocity fluid;
   said high velocity fluid from said first nozzle being discharged tangential to an outer surface of said nozzle and following the contour thereof;
   said first nozzle being positioned so that when said high velocity fluid separates from the outer surface of said nozzle, said high velocity fluid flows at an angle relative to an undeflected exhaust gas flow direction; and
   said second nozzle being positioned to discharge said high velocity fluid at an angle relative to the undeflected gas flow direction.

4. The system of claim 3 wherein said high velocity fluid from said first and second nozzles flows substantially perpendicular to the undeflected exhaust gas flow direction.

5. A system for deflecting a fluid stream comprising:
   a first nozzle disposed adjacent to an edge of said fluid stream;
   said first nozzle including an opening for discharging a high velocity fluid;
   said high velocity fluid being discharged tangential to an outer surface of said first nozzle and following the contour thereof;
   said first nozzle being positioned so that when said high velocity fluid separates from the outer surface of said first nozzle, said high velocity fluid flows at an angle relative to an undeflected fluid stream direction;
   a second nozzle disposed adjacent to an opposing edge of said fluid stream;
   said second nozzle including an opening for discharging high velocity fluid;
   said high velocity fluid being discharged tangential to an outer surface of said second nozzle and following the contour thereof; and
   said second nozzle being positioned so that when said high velocity fluid separates from the outer surface of said second nozzle, said high velocity fluid flows at an angle relative to the undeflected fluid stream direction.

6. The system of claim 5 wherein when said high velocity fluid separates from the outer surface of each of said nozzles, said high velocity fluid flows substantially perpendicular to the undeflected fluid stream direction.

7. A system for deflecting a fluid stream comprising;
   a first nozzle and a second nozzle, said nozzles being disposed on opposing sides of said fluid stream;
   each nozzle including an opening for discharging a high velocity fluid;
   said high velocity fluid from said first nozzle being discharged tangential to an outer surface of said nozzle and following the contour thereof;
   said first nozzle being positioned so that when said high velocity fluid separates from the outer surface of said nozzle, said high velocity fluid flows at an angle relative to an undeflected fluid stream direction; and
   said second nozzle being positioned to discharge said high velocity fluid at an angle relative to the undeflected fluid stream direction.

8. The system of claim 7 wherein when said high velocity fluid from said first and second nozzles flows substantially perpendicular to the undeflected fluid stream direction.

* * * * *